(12) United States Patent
Li et al.

(10) Patent No.: US 10,921,621 B2
(45) Date of Patent: Feb. 16, 2021

(54) OPTICAL STRUCTURE, DISPLAY DEVICE AND OPERATING METHOD THEREOF

(71) Applicant: BOE TECHNOLOGY GROUP CO., LTD., Beijing (CN)

(72) Inventors: Zhongxiao Li, Beijing (CN); Xiaochuan Chen, Beijing (CN); Wenqing Zhao, Beijing (CN); Qian Wang, Beijing (CN); Ming Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 73 days.

(21) Appl. No.: 16/318,346

(22) PCT Filed: Mar. 1, 2018

(86) PCT No.: PCT/CN2018/077769
§ 371 (c)(1),
(2) Date: Jan. 16, 2019

(87) PCT Pub. No.: WO2018/171403
PCT Pub. Date: Sep. 27, 2018

(65) Prior Publication Data
US 2019/0285918 A1    Sep. 19, 2019

(30) Foreign Application Priority Data

Mar. 20, 2017  (CN) .......................... 2017 1 0165048

(51) Int. Cl.
*G02F 1/13*  (2006.01)
*G02F 1/1337*  (2006.01)

(52) U.S. Cl.
CPC .......... *G02F 1/1323* (2013.01); *G02F 1/1337* (2013.01); *G02F 2001/133749* (2013.01)

(58) Field of Classification Search
CPC ..................................................... G02F 1/1323
See application file for complete search history.

(56) References Cited

U.S. PATENT DOCUMENTS

2006/0104084 A1    5/2006  Amemiya et al.
2009/0033830 A1    2/2009  Tsai et al.
(Continued)

FOREIGN PATENT DOCUMENTS

CN    104880760 A    9/2015
CN    105549236 A    5/2016
(Continued)

OTHER PUBLICATIONS

English translation of first Chinese Office Action dated Mar. 4, 2019, for corresponding Chinese Application No. 201710165048.1.
(Continued)

*Primary Examiner* — Sang V Nguyen
(74) *Attorney, Agent, or Firm* — Kinney & Lange, P.A.

(57) ABSTRACT

An optical structure, a display device and an operating method thereof are provided. The optical structure includes: first electrode and second electrode arranged opposite to each other; first alignment layer; second alignment layer; liquid crystal molecules arranged between first alignment layer and second alignment layer; and insulative protrusions arranged at a side of first alignment layer facing second alignment layer. The insulative protrusions are spaced apart from and arranged parallel to each other, and the protrusion has a same refractive index as the liquid crystal molecules in energized or de-energized state. Through controlling electric signals applied to first electrode and second electrode, it is able to switch the optical structure between first state where the optical structure does not change propagation direction of light entering the optical structure and second state where
(Continued)

the optical structure is capable of changing propagation direction of light entering the optical structure.

17 Claims, 1 Drawing Sheet

(56) References Cited

U.S. PATENT DOCUMENTS

| | | | | |
|---|---|---|---|---|
| 2010/0091204 | A1* | 4/2010 | Chen | G02B 30/27 349/15 |
| 2011/0157531 | A1* | 6/2011 | Suwa | C07C 69/736 349/124 |
| 2013/0076785 | A1 | 3/2013 | Chen | |
| 2013/0229606 | A1* | 9/2013 | Asaoka | G02F 1/1334 349/123 |
| 2013/0293818 | A1 | 11/2013 | Murata et al. | |
| 2014/0240627 | A1* | 8/2014 | Wu | G02F 1/133504 349/16 |
| 2015/0293402 | A1* | 10/2015 | Shinkai | G02F 1/133526 349/15 |
| 2016/0349438 | A1 | 12/2016 | Ma et al. | |
| 2017/0097537 | A1* | 4/2017 | Park | G02F 1/13475 |
| 2018/0052342 | A1 | 2/2018 | Chang et al. | |
| 2018/0052346 | A1* | 2/2018 | Sakai | G02F 1/13471 |
| 2018/0059450 | A1* | 3/2018 | Li | G02F 1/1343 |
| 2018/0088367 | A1 | 3/2018 | Zhong | |
| 2018/0188576 | A1 | 7/2018 | Xu et al. | |

FOREIGN PATENT DOCUMENTS

| | | |
|---|---|---|
| CN | 105589228 A | 5/2016 |
| CN | 106054423 A | 10/2016 |
| CN | 106444185 A | 2/2017 |
| CN | 106483694 A | 3/2017 |
| CN | 106647048 A | 5/2017 |
| WO | 2012017931 A1 | 2/2012 |

OTHER PUBLICATIONS

International Search Report and Written Opinion dated May 29, 2019, for corresponding PCT Application No. PCT/CN2018/077769.

* cited by examiner

OPTICAL STRUCTURE, DISPLAY DEVICE AND OPERATING METHOD THEREOF

CROSS-REFERENCE TO RELATED APPLICATION

The present application is the U.S. national phase of PCT Application No. PCT/CN2018/077769 filed on Mar. 1, 2018, which claims a priority to Chinese Patent Application No. 201710165048.1 filed on Mar. 20, 2017, the disclosures of which are incorporated in their entirety by reference herein.

TECHNICAL FIELD

The present disclosure relates to the field of display technology, and in particular to an optical structure, a display device, and an operating method thereof.

BACKGROUND

Liquid crystal display technology, as a mainstream display technology in the market, is capable of meeting people's requirements in terms of resolution, response time, screen size, and so on. In practice, in some special display scenarios, a special display mode needs to be provided so as to meet a special requirement. For example, in an office scenario or other private scenarios, it is required that a screen of a display is merely visible to a user himself and is invisible to the others, i.e., a peep-proof display mode needs to be provided. In some other scenarios, it is required that a screen of a display panel is shared by multiple users, i.e., a shared display mode needs to be provided.

A conventional peep-proof display technology is achieved by adding a special peep-proof membrane to a display panel, which may merely realize peep-proof display and cannot realize switching between a peep-proof display and a shared display.

SUMMARY

In an aspect, the present disclosure provides in at least one embodiment an optical structure, including: a first electrode and a second electrode arranged opposite to each other; a first alignment layer arranged at a side of the first electrode facing the second electrode; a second alignment layer arranged at a side of the second electrode facing the first electrode; liquid crystal molecules arranged between the first alignment layer and the second alignment layer; and a plurality of protrusions which is insulative and arranged at a side of the first alignment layer facing the second alignment layer. The protrusions of the plurality of protrusions are spaced apart from each other and arranged parallel to each other, and each protrusion of the plurality of protrusions has a same refractive index as the liquid crystal molecules in an energized or de-energized state.

In some possible embodiments, liquid crystal molecules are positive liquid crystal molecules, the liquid crystal molecules have a pretilt angle of 0 degrees, and the liquid crystal molecules have an azimuth angle of 0 degrees in the de-energized state; or, the liquid crystal molecules are negative liquid crystal molecules, the liquid crystal molecules have a pretilt angle of 89 degrees, and the liquid crystal molecules have an azimuth angle of 0 degrees in the energized state.

In some possible embodiments, the liquid crystal molecules are positive liquid crystal molecules, the liquid crystal molecules have a pretilt angle of 0 degrees, and the liquid crystal molecules have an azimuth angle of 90 degrees in the de-energized state; or, the liquid crystal molecules are negative liquid crystal molecules, the liquid crystal molecules have a pretilt angle of 89 degrees, and the liquid crystal molecules have an azimuth angle of 90 degrees in the energized state.

In some possible embodiments, an optical path length of light transmitted in the protrusion is d1, an optical path length of the light transmitted in the other portion of the optical structure except the protrusions is d2, and $d2-d1=(2n+1)*\lambda/2$, where $\lambda$ represents a wavelength of the light, and n is an integer greater than or equal to 0.

In some possible embodiments, each protrusion of the plurality of protrusions is of a rectangular cuboid shape.

In some possible embodiments, each of the first electrode and the second electrode is a plane-like electrode.

In some possible embodiments, the refractive index of the liquid crystal modules in the de-energized state for horizontally-polarized light is the same as the refractive index of the protrusions.

In some possible embodiments of the present disclosure, a width of each protrusion of the plurality of protrusions is equal to a distance between adjacent protrusions.

In another aspect, the present disclosure provides in some embodiments a display device, including a backlight source, a display panel, and the above-mentioned optical structure arranged between the display panel and the backlight source.

In some possible embodiments, the backlight source is a collimated backlight source.

In some possible embodiments, the display device further includes a polarizer arranged between the optical structure and the display panel, and a direction of a transmission axis of the polarizer is parallel to a direction of an azimuth angle of the liquid crystal molecules adjacent to the polarizer.

In some possible embodiments, the liquid crystal molecules are in an electrically controlled birefringence (ECB) mode, and an alignment direction of each of the first alignment layer and the second alignment layer is parallel to the direction of the transmission axis of the polarizer.

In some possible embodiments, the liquid crystal molecules are in a twisted nematic (TN) mode, an alignment direction of one of the first alignment layer and the second alignment layer which is closer to the polarizer is parallel to a direction of the transmission axis of the polarizer, and an alignment direction of the other one of the first alignment layer and the second alignment layer which is farther away from the polarizer is perpendicular to the direction of the transmission axis of the polarizer.

In another aspect, the present disclosure provides in some embodiments an operating method for a display device, applied to the above described display device, including controlling electric signals applied to the first electrode and the second electrode, to cause the optical structure to be switched between a first state and a second state, where in the first state, the optical structure does not change a propagation direction of light from the backlight source, and in the second state, the optical structure is capable of changing the propagation direction of the light from the backlight source.

The embodiments of the present disclosure have advantages as described in the following. In the above solutions, the optical structure is arranged between the display panel and the backlight source, and the electric signals applied to the electrodes of the optical structure are controlled, so as to switch the optical structure between the first state in which the optical structure does not change the propagation direction of the light from the backlight source and the second state in which the optical structure is capable of changing the propagation direction of the light from the backlight source. In this way, when the light beam from the backlight source has a relatively small viewing range, a peep-proof display of the display device may be achieved in a case that the optical structure is in the first state, and the viewing range of the light beam from the backlight source may be enlarged and a shared display of the display device may be achieved in a case that the optical structure is in the second state. When the light beam from the backlight source has a relatively large viewing range, a shared display of the display device may be achieved in a case that the optical structure is in the first state, and the viewing range of the light beam from the backlight source may be reduced and a peep-proof display of the display device may be achieved in a case that the optical structure is in the second state. As a result, switching between the peep-proof display and the shared display of the display device is achieved based on the technical solutions of the present disclosure.

DETAILED DESCRIPTION OF THE EMBODIMENTS

To better clarify the addressed issues, the technical solutions and the advantages of the present disclosure, the present disclosure will be described in detail hereinafter in conjunction with the drawings and the embodiments.

In the related technologies, switching between a peep-proof display and a shared display cannot be achieved. In view of the above, the present disclosure provides an optical structure, a display device and an operating method thereof, which can realize switching between a peep-proof display and a shared display.

Figure 1:
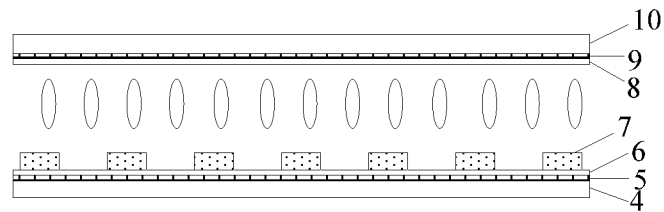
FIG. 1 is a sectional view of an optical structure according to an embodiment of the present disclosure.

The present disclosure provides in some embodiments an optical structure which, as shown in FIG. 1, includes: a first electrode 5 and a second electrode 9 arranged opposite to each other; a first alignment layer 6 arranged at a side of the first electrode 5 facing the second electrode 9; a second alignment layer 8 arranged at a side of the second electrode 9 facing the first electrode 5; liquid crystal molecules arranged between the first alignment layer 6 and the second alignment layer 8; and multiple protrusions 7 which are insulative and arranged at a side of the first alignment layer 6 facing the second alignment layer 8. The multiple protrusions 7 are spaced apart from each other and arranged parallel to each other, and each protrusion 7 has a same refractive index as the liquid crystal molecules in an energized or de-energized state. Through controlling electric signals applied to the first electrode 5 and the second electrode 9, it is able to cause the optical structure to switch between a first state in which the optical structure does not change a propagation direction of light entering the optical structure and a second state in which the optical structure is capable of changing the propagation direction of the light entering the optical structure.

In some possible embodiments, the optical structure further includes a first substrate 4 and a second substrate 10 which serve as support members. The first electrode 5 may be arranged on the first substrate 4, and the second electrode 9 may be arranged on the second substrate 10.

The optical structure according to the embodiments of the present disclosure may be arranged between a display panel and a backlight source. By controlling the electric signals applied to the electrodes of the optical structure, the optical structure can switch between the first state in which the optical structure does not change the propagation direction of the light from the backlight source and the second state in which the optical structure is capable of changing the propagation direction of the light from the backlight source. In this way, when the light beam from the backlight source has a relatively small viewing range, a peep-proof display of the display device may be achieved in a case that the optical structure is in the first state, and the viewing range of the light beam from the backlight source may be enlarged and a shared display of the display device may be achieved in a case that the optical structure is in the second state. When the light beam from the backlight source has a relatively large viewing range, a shared display of the display device may be achieved in a case that the optical structure is in the first state, and the viewing range of the light beam from the backlight source may be reduced and a peep-proof display of the display device may be achieved in a case that the optical structure is in the second state. As a result, switching between the peep-proof display and the shared display of the display device is achieved based on the technical solutions of the present disclosure.

To be specific, in the second state, an incident angle of the light when it is incident on the optical structure is smaller than an exit angle of the light when it exits the optical structure. In this way, when the light beam from the backlight source has a relatively small viewing range, a peep-proof display of the display device may be achieved in a case that the optical structure is in the first state, and the viewing range of the light beam from the backlight source may be enlarged and a shared display of the display device may be achieved in a case that the optical structure is in the second state.

To be specific, a light source for generating the light beam and a light guide plate may together form an edge-type backlight structure. After the light beam passes through a backlight collimation structure, a divergence angle of the light beam may be restricted within a certain small range. A direct-type backlight structure or any other backlight structure may also be adopted, as long as the exit angle of the light beam exiting the backlight structure is within a small angle range. When the light beam exits the backlight structure and enters the optical structure in the second state, the light beam may be diffused into a large angle light source. For example, for the light beam having an incident angle range of −30° to 30°, its angle range may become −60° to 60° after passing through the optical structure, and for the light beam having an incident angle range of −25° to 25°, its angle range may become −50° to 50° after passing through the optical structure. When the diffused light beam pass through the display panel, it is able for multiple persons to view an image displayed on the display panel, i.e., in this case, the display device is in the shared display mode. When the light beam exits the backlight structure and enters the optical structure in the first state, the angle of the light beam may not change, and the divergence angle of the light beam is relatively small, which meets a condition of peep-proof display.

Optionally, in the second state, the incident angle of the light when it is incident on the optical structure may be greater than the exit angle of the light when it exits the optical structure. In this way, when the light beam from the backlight source has a relatively large viewing range, a shared display of the display device may be achieved in a case that the optical structure is in the first state, and the viewing range of the light beam from the backlight source may be reduced and a peep-proof display of the display device may be achieved in a case that the optical structure is in the second state.

The first substrate 4 and the second substrate 10 each may be a glass or quartz substrate, or may be made of other transparent material with certain rigidity.

The first electrode 5 and the second electrode 9 may be made of a transparent conductive material, such as indium tin oxide (ITO), indium zinc oxide (IZO) or graphene, which have good conductivity and light transmittance.

Each protrusion 7 may be made of a resin material or other insulation material. The refractive index of the protrusion 7 needs to be matched with the refractive index of the liquid crystal molecules, so as to be equal to the refractive index of the liquid crystal molecules in the energized or de-energized state.

The liquid crystal molecules may be positive or negative liquid crystal molecules.

Figure 2:
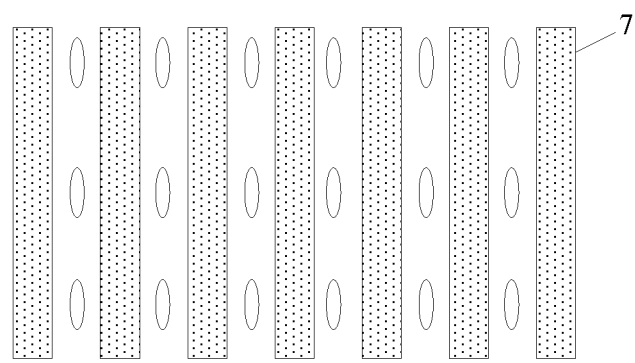
FIG. 2 is a schematic view of a liquid crystal layer in an initial state according to an embodiment of the present disclosure.

In a possible embodiment of the present disclosure, as shown in FIG. 2, the liquid crystal molecules are positive liquid crystal molecules, the liquid crystal molecules have a pretilt angle of 0 degrees in an initial state, and a direction of a long axis of the liquid crystal molecules is parallel to an extension direction of each protrusion 7 in the de-energized state. An alignment direction of the liquid crystal molecules depends on an alignment direction of the alignment layer. A photo-induced alignment technology may be adopted for the alignment layer, so as to provide the liquid crystal molecules with the pretilt angle of 0 degrees. The light beam entering the optical structure may be a natural light beam having a small angle range, and it may be considered that the light beam consists of horizontally-polarized light and vertically-polarized light. In the de-energized state, a refractive index of the liquid crystal molecules for the horizontally-polarized light is no, and a refractive index of the liquid crystal molecules for the vertically-polarized light is ne. The refractive index no is the same as the refractive index of the protrusion 7, and the horizontally-polarized light is transmitted normally. The refractive index ne is greater than the refractive index of the protrusion 7 and the refractive index no, forming a difference between the refractive indices in the optical structure. The vertically-polarized light may be deflected after exiting the optical structure, and the vertically-polarized light exiting the optical structure may have a relatively large angle range. When the horizontally-polarized and vertically-polarized light exit the optical structure and are to enter the display panel, the horizontally-polarized light cannot pass through a polarizer between the display panel and the optical structure, in which case the display device is in the shared display mode. When the electric signals are applied to the first electrode 5 and/or the second electrode 9, the liquid crystal molecules may gradually stand upright under the effect of an electric field. At this time, the refractive index of the liquid crystal molecules for the horizontally-polarized light is still no, and the horizontally-polarized light is transmitted normally. When the liquid crystal molecules have stood upright completely, the refractive index of the liquid crystal molecules for the vertically-polarized light is no, and the vertically-polarized light is transmitted normally and may not be deflected. The vertically-polarized light beam exiting the optical structure has a relatively small angle range. For the polarizer between the display panel and the optical structure, the horizontally-polarized light cannot pass through it, and the vertically-polarized light is transmitted normally, in which case the display device is in the peep-proof display mode.

In some possible embodiments of the present disclosure, the liquid crystal molecules may be negative liquid crystal molecules, the liquid crystal molecules may have a pretilt angle of 89 degrees, and in the de-energized state, a direction of a long axis of the liquid crystal molecules may be parallel to a height direction of the protrusion 7. When the electric signals are applied to the first electrode 5 and/or the second electrode 9, a vertical electric field may be generated, and the negative liquid crystal molecules may be deflected in a direction perpendicular to a direction of the electric field. Hence, in the energized state, the liquid crystal molecules may be gradually changed to be in a horizontal state. Through the matching between the refractive index of the liquid crystal molecules and the refractive index of the protrusion, switching between the peep-proof display mode and the shared display mode can also be achieved.

When the refractive index of the protrusion 7 is not equal to the refractive index ne or the refractive index no of the liquid crystal molecules, but has a value between the refractive index ne and refractive index no, the pretilt angle of the liquid crystal molecules may be changed to cause the refractive index of the protrusion 7 to be the same as that of the liquid crystal molecules in the energized state or in the de-energized state. In a case that the refractive index of the protrusion 7 is the same as the refractive index of the liquid crystal molecules in the energized state, there may exist a difference between the refractive index of the protrusion 7 and the refractive index of the liquid crystal molecules in the de-energized state. In a case that the refractive index of the protrusion 7 is the same as the refractive index of the liquid crystal molecules in the de-energized state, there may exist a difference between the refractive index of the protrusion 7 and the refractive index of the liquid crystal molecules in the energized state. In this way, switching between the peep-proof display mode and the shared display mode can also be achieved.

In another possible embodiment of the present disclosure, the liquid crystal molecules are positive liquid crystal molecules, the liquid crystal molecules have a pretilt angle of 0 degrees in an initial state, and an azimuth angle of the liquid crystal molecules is 90 degrees in the de-energized state. An alignment direction of the liquid crystal molecules depends on an alignment direction of the alignment layer. A photo-induced alignment technology may be adopted for the alignment layer, so as to provide the liquid crystal molecules with the pretilt angle of 0 degrees. The light beam entering the optical structure may be a natural light beam having a small angle range, and it may be considered that the light beam consists of horizontally-polarized light and vertically-polarized light. In the de-energized state, a refractive index of the liquid crystal molecules for the vertically-polarized light is no, and a refractive index of the liquid crystal molecules for the horizontally-polarized light is ne. The refractive index no is the same as the refractive index of the protrusion 7, and the vertically-polarized light is transmitted normally. The refractive index ne is greater than the refractive index of the protrusion 7 and the refractive index no, forming a difference between the refractive indices, the horizontally-polarized light may be deflected after exiting the optical structure, and the horizontally-polarized light beam exiting the optical structure may have a relatively large angle range. When the horizontally-polarized and vertically-polarized light exit the optical structure and are to enter the display panel, the vertically-polarized light cannot pass through the polarizer between the display panel and the optical structure, in which case the display device is in the shared display mode. When the electric signals are applied to the first electrode 5 and/or the second electrode 9, the liquid crystal molecules may gradually stand upright under the effect of an electric field. At this time, the refractive index for the vertically-polarized light is still no, and the vertically-polarized light is transmitted normally. When the liquid crystal molecules have stood upright completely, the refractive index for the horizontally-polarized light is no, and the horizontally-polarized light is transmitted normally and may not be deflected. The horizontally-polarized light beam exiting the optical structure has a relatively small angle range. For the polarizer between the display panel and the optical structure, the vertically-polarized light cannot pass through it, and the horizontally-polarized light is transmitted normally, in which case the display device is in the peep-proof display mode.

In some possible embodiments of the present disclosure, the liquid crystal molecules may also be negative liquid crystal molecules, the liquid crystal molecules have a pretilt angle of 89 degrees, and an azimuth angle of the liquid crystal molecules is 90 degrees in the energized state. When the electric signals are applied to the first electrode 5 and/or the second electrode 9, a vertical electric field may be generated, and the negative liquid crystal molecules are deflected in a direction perpendicular to an electric field direction. Hence, in the energized state, the liquid crystal molecules are gradually changed to be in a horizontal state. Through the matching between the refractive index of the liquid crystal molecules and the refractive index of the protrusion, switching between the peep-proof display mode and the shared display mode can be achieved.

The pretilt angle of the liquid crystal molecule is an angle between the direction of the long axis of the liquid crystal molecule and a plane where the first substrate is located, and the azimuth angle of the liquid crystal molecule is an angle between a direction of a long axis of an projection of the liquid crystal molecule onto the plane where the first substrate is located and the extension direction of the protrusion.

To be specific, each protrusion 7 may be of rectangular cuboid shape. The optical structure is capable of changing a viewing range in a plane perpendicular to the extension direction of the protrusion 7. For example, when the display panel is arranged to face toward a user and the protrusion 7 extends along atop-bottom direction of the display panel, the viewing range for the user in a left-right direction may be affected by the optical structure, and switching between the peep-proof display mode and the shared display mode can be realized in the left-right direction.

The protrusions 7 are approximately distributed with a period of 1.5 μm, and the period is a sum of a width of the protrusion 7 and a distance between adjacent protrusions 7. The period of the protrusions 7 may be adjusted in accordance with a wavelength of incident light and a desired diffusion effect of the light, but it may be on the order of wavelength. A ratio of the width of the protrusion 7 to the distance between the adjacent protrusions 7 may be set in accordance with practical needs, and usually the ratio of the width of the protrusion 7 to the distance between the adjacent protrusions 7 may be 1:1. A thickness of the protrusion 7 may be set in accordance with the wavelength of the incident light, and needs to meet the following formula: $d2-d1=(2n+1)*\lambda/2$, where d1 represents an optical path length of the light within the protrusion 7, d2 represents an optical path length of the light transmitted in the other portion of the optical structure except the protrusions, $\lambda$ represents the wavelength of the light, and n is an integer greater than or equal to 0. Gaps between the protrusions 7 are filled with the liquid crystal molecules, and different signals may be applied to the electrodes to cause the liquid crystal molecules to be in different deflection states. In this way, the refractive index for the incident light may change, achieving switching between the peep-proof display mode and the shared display mode.

To be specific, the first electrode 5 and the second electrode 9 each may be a plane-like electrode to simplify the manufacture process, and a vertical electric field may be formed between the first electrode 5 and the second electrode 9. The first electrode 5 and the second electrode 9 may also be of any other shapes, e.g., the first electrode 5 may be a strip-like electrode while the second electrode 9 may be a plane-like electrode, or the second electrode 9 may be a strip-like electrode while the second electrode 9 may be a plane-like electrode.

Figure 3:
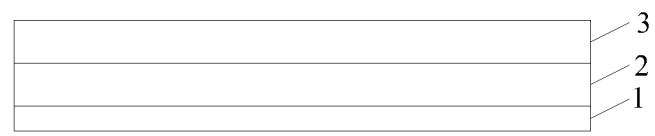
FIG. 3 is a schematic view of a display device according to an embodiment of the present disclosure.

The present disclosure further provides in some embodiments a display device which, as shown in FIG. 3, includes a backlight source 1, a display panel 3, and the above-mentioned optical structure 2 arranged between the display panel 3 and the backlight source 1.

The display device may be any product or member having a display function, e.g., liquid crystal television, liquid crystal display, digital photo frame, mobile phone or tablet computer. The display device may further include a flexible circuit board, a printed circuit board and a back plate.

According to the embodiments of the present disclosure, the optical structure is arranged between the display panel and the backlight source, and by controlling the electric signals applied to the electrodes of the optical structure, the optical structure can switch between the first state in which the optical structure does not change the propagation direction of the light from the backlight source and the second state in which the optical structure is capable of changing the propagation direction of the light from the backlight source. In this way, when the light beam from the backlight source has a relatively small viewing range, a peep-proof display of the display device may be achieved in a case that the optical structure is in the first state, and the viewing range of the light beam from the backlight source may be enlarged and a shared display of the display device may be achieved in a case that the optical structure is in the second state. When the light beam from the backlight source has a relatively large viewing range, a shared display of the display device may be achieved in a case that the optical structure is in the first state, and the viewing range of the light beam from the backlight source may be reduced and a peep-proof display of the display device may be achieved in a case that the optical structure is in the second state. As a result, switching between the peep-proof display and the shared display of the display device is achieved based on the technical solutions of the present disclosure.

To be specific, the backlight source may be a collimated backlight source. The light beam emitted by the collimated backlight source has a relatively small viewing range. When the optical structure is in the first state, the peep-proof display of the display device is achieved, and when the optical structure is in the second state, the viewing range of the light beam from the backlight source may be enlarged and the shared display of the display device is achieved.

In some possible embodiments of the present disclosure, the display device further includes a polarizer arranged between the optical structure 2 and the display panel 3, and a direction of a transmission axis of the polarizer is parallel to a direction of an azimuth angle of the liquid crystal molecules close to the polarizer. Through this design, the viewing range of the light beam in a direction perpendicular to the direction of the azimuth angle of the liquid crystal molecules can be enlarged, and the resultant light beam can pass through the polarizer.

In a possible embodiment, the liquid crystal molecules may be in an electrically controlled birefringence (ECB) mode or a twisted nematic (TN) mode. For the liquid crystal molecules in the ECB mode, the direction of the long axis of the liquid crystal molecules needs to be the same as the direction of the transmission axis of the polarizer between the display panel and the optical structure, i.e., the alignment direction of each of the first alignment layer 6 and the second alignment layer 8 needs to be parallel to the direction of the transmission axis of the polarizer.

For the liquid crystal molecules in the TN mode, the direction of the long axis of the liquid crystal molecules at an upper layer needs to be the same as the direction of the transmission axis of the polarizer between the display panel and the optical structure, and the direction of the long axis of the liquid crystal molecules at a lower layer needs to be perpendicular to the direction of the transmission axis of the polarizer. In other words, the alignment direction of one of the first alignment layer 6 and the second alignment layer 8 adjacent to the polarizer needs to be parallel to the direction of the transmission axis of the polarizer, and the alignment direction of the other one of the first alignment layer 6 and the second alignment layer 8 away from the polarizer needs to be perpendicular to the direction of the transmission axis of the polarizer.

The present disclosure further provides in some embodiments an operating method for a display device, applied to the above-mentioned display device, which includes controlling electric signals applied to the first electrode 5 and the second electrode 9, to cause the optical structure to be switched between a first state in which the optical structure does not change a propagation direction of the light from the backlight source and a second state in which the optical structure is capable of changing the propagation direction of the light from the backlight source.

When applying the electric signals to the first electrode 5 and the second electrode 9, a signal, com, having a value of 0V may be applied to one of the electrodes, and an square signal ±Vop may be applied to the other one of the electrodes, to switch the optical structure between the first state and the second state, where magnitude of Vop is adjustable.

According to the embodiments of the present disclosure, the optical structure is arranged between a display panel and a backlight source, and by controlling the electric signals applied to the electrodes of the optical structure, the optical structure can switch between the first state in which the optical structure does not change the propagation direction of the light from the backlight source and the second state in which the optical structure is capable of changing the propagation direction of the light from the backlight source. In this way, when the light beam from the backlight source has a relatively small viewing range, a peep-proof display of the display device may be achieved in a case that the optical structure is in the first state, and the viewing range of the light beam from the backlight source may be enlarged and a shared display of the display device may be achieved in a case that the optical structure is in the second state. When the light beam from the backlight source has a relatively large viewing range, a shared display of the display device may be achieved in a case that the optical structure is in the first state, and the viewing range of the light beam from the backlight source may be reduced and a peep-proof display of the display device may be achieved in a case that the optical structure is in the second state. As a result, switching between the peep-proof display and the shared display of the display device is achieved based on the technical solutions of the present disclosure.

Unless otherwise defined, any technical or scientific terms used herein shall have the common meanings understood by a person of ordinary skills. Terms such as "first" and "second" used in the present disclosure are merely used to differentiate different components rather than to represent any order, quantity or importance. Terms such as "include" or "contain" indicate that an element or object before such terms covers an element, an object or the equivalent enumerated after such terms, and do not exclude other elements and objects. Terms such as "connect/connected to" or "couple/coupled to" are not used to limit physical or mechanical connection, and they may be direct or indirect electrical connection. Terms such as "on", "under", "left" and "right" are merely used to represent relative position relationships, and when an absolute position of a described object is changed, relative positions with respect to the described object may change correspondingly.

It should be appreciated that, in the case that an element such as layer, film, region or substrate is arranged "on" or "under" another element, it may be directly arranged "on" or "under" the other element, or an intermediate element may be arranged therebetween.

The above descriptions are merely optional embodiments of the present disclosure. It should be pointed out that, a person ordinary skilled in the art may make further modifications and improvements without departing from the principle of the present disclosure, and these modifications and improvements shall also fall within the protection scope of the present disclosure.

What is claimed is:

1. An optical structure, comprising:
   a first electrode and a second electrode arranged opposite to each other;
   a first alignment layer arranged at a side of the first electrode facing the second electrode;
   a second alignment layer arranged at a side of the second electrode facing the first electrode;
   liquid crystal molecules arranged between the first alignment layer and the second alignment layer; and
   a plurality of protrusions which is insulative and arranged at a side of the first alignment layer facing the second alignment layer,
   wherein protrusions of the plurality of protrusions are spaced apart from each other and arranged parallel to each other, and each protrusion of the plurality of protrusions has a same refractive index as the liquid crystal molecules in an energized or de-energized state;
   wherein for light incident to the optical structure, an optical path length of the light transmitted in the protrusions is d1, an optical path length of the light transmitted in other portions of the optical structure except the protrusions is d2, and $d2-d1=(2n+1)*\lambda/2$, where $\lambda$ represents a wavelength of the light, and n is an integer greater than or equal to 0.

2. The optical structure according to claim 1, wherein: the liquid crystal molecules are positive liquid crystal molecules, the liquid crystal molecules have a pretilt angle of 0 degrees, and the liquid crystal molecules have an azimuth angle of 0 degrees in the de-energized state; or, the liquid crystal molecules are negative liquid crystal molecules, the liquid crystal molecules have a pretilt angle of 89 degrees, and the liquid crystal molecules have an azimuth angle of 0 degrees in the energized state; or, the liquid crystal molecules are positive liquid crystal molecules, the liquid crystal molecules have a pretilt angle of 0 degrees, and the liquid crystal molecules have an azimuth angle of 90 degrees in the de-energized state; or, the liquid crystal molecules are negative liquid crystal molecules, the liquid crystal molecules have a pretilt angle of 89 degrees, and the liquid crystal molecules have an azimuth angle of 90 degrees in the energized state; and wherein the pretilt angle of the liquid crystal molecule is an angle between a direction of a long axis of the liquid crystal molecule and a plane where the first alignment layer is located, and the azimuth angle of the liquid crystal molecule is an angle between a direction of a long axis of an projection of the liquid crystal molecule onto the plane where the first alignment layer is located and an extension direction of the protrusion.

3. The optical structure according to claim 1, wherein each protrusion of the plurality of protrusions is of a rectangular cuboid shape.

4. The optical structure according to claim 1, wherein each of the first electrode and the second electrode is a plane-like electrode.

5. The optical structure according to claim 1, wherein the refractive index of the liquid crystal molecules in the de-energized state for horizontally-polarized light is the same as the refractive index of the protrusions.

6. The optical structure according to claim 1, wherein a width of each protrusion of the plurality of protrusions is equal to a distance between adjacent protrusions.

7. A display device, comprising a backlight source, a display panel, and the optical structure according to claim 1, wherein the optical structure is arranged between the display panel and the backlight source.

8. The display device according to claim 7, wherein the backlight source is a collimated backlight source.

9. The display device according to claim 8, further comprising a polarizer arranged between the optical structure and the display panel, wherein a direction of a transmission axis of the polarizer is parallel to a direction of an azimuth angle of the liquid crystal molecules close to the polarizer.

10. The display device according to claim 9, wherein:
the liquid crystal molecules are in an electrically controlled birefringence (ECB) mode, and an alignment direction of each of the first alignment layer and the second alignment layer is parallel to the direction of the transmission axis of the polarizer; or the liquid crystal molecules are in a twisted nematic (TN) mode, an alignment direction of one of the first alignment layer and the second alignment layer which is closer to the polarizer is parallel to the direction of the transmission axis of the polarizer, and an alignment direction of the other one of the first alignment layer and the second alignment layer which is farther away from the polarizer is perpendicular to the direction of the transmission axis of the polarizer.

11. An operating method for a display device, applied to the display device according to claim 7, comprising controlling electric signals applied to the first electrode and the second electrode, to cause the optical structure to be switched between a first state and a second state, wherein in the first state, the optical structure does not change a propagation direction of light from the backlight source, and in the second state, the optical structure is capable of changing the propagation direction of the light from the backlight source.

12. The optical structure according to claim 2, wherein each protrusion of the plurality of protrusions is of a rectangular cuboid shape.

13. The optical structure according to claim 2, wherein each of the first electrode and the second electrode is a plane-like electrode.

14. The optical structure according to claim 2, wherein the refractive index of the liquid crystal molecules in the de-energized state for horizontally-polarized light is the same as the refractive index of the protrusions.

15. The optical structure according to claim 3, wherein the refractive index of the liquid crystal molecules in the de-energized state for horizontally-polarized light is the same as the refractive index of the protrusions.

16. The optical structure according to claim 2, wherein a width of each protrusion of the plurality of protrusions is equal to a distance between adjacent protrusions.

17. The optical structure according to claim 3, wherein a width of each protrusion of the plurality of protrusions is equal to a distance between adjacent protrusions.

* * * * *